US007627856B2

(12) United States Patent  
Schwarzmann

(10) Patent No.: US 7,627,856 B2  
(45) Date of Patent: Dec. 1, 2009

(54) SYSTEMS, METHODS, AND ARTICLES OF MANUFACTURE FOR HANDLING HIERARCHICAL APPLICATION DATA

(75) Inventor: Winfried Schwarzmann, Waghaeusel (DE)

(73) Assignee: SAP AG, Walldorf (DE)

( * ) Notice: Subject to any disclaimer, the term of this patent is extended or adjusted under 35 U.S.C. 154(b) by 1081 days.

(21) Appl. No.: 11/025,052

(22) Filed: Dec. 30, 2004

(65) Prior Publication Data

US 2006/0015848 A1    Jan. 19, 2006

(30) Foreign Application Priority Data

Jul. 14, 2004    (EP) ................... 04016604

(51) Int. Cl.
  G06F 9/44    (2006.01)
  G06F 7/00    (2006.01)
  G06F 3/00    (2006.01)

(52) U.S. Cl. .............. 717/120; 707/1; 719/312

(58) Field of Classification Search ........... 717/100, 717/104–105, 120–123; 707/1, 2, 104.1; 719/312

See application file for complete search history.

(56) References Cited

U.S. PATENT DOCUMENTS

| | | | |
|---|---|---|---|
| 5,187,786 A * | 2/1993 | Densmore et al. ............ 707/3 |
| 5,285,391 A | 2/1994 | Smith, Jr. et al. |
| 5,521,910 A | 5/1996 | Matthews et al. |
| 5,948,107 A * | 9/1999 | Ramanathan ............... 714/2 |
| 6,240,335 B1 * | 5/2001 | Wehrung et al. ............ 700/230 |
| 6,366,922 B1 * | 4/2002 | Althoff ................... 707/103 R |
| 7,353,220 B2 | 4/2008 | Schwarzmann |
| 2002/0069258 A1 * | 6/2002 | Howard et al. ............. 709/217 |
| 2002/0152294 A1 * | 10/2002 | Evans et al. ............... 709/223 |
| 2003/0014286 A1 | 1/2003 | Cappellini |
| 2003/0172135 A1 | 9/2003 | Bobick et al. |
| 2004/0103117 A1 | 5/2004 | Segler |

(Continued)

FOREIGN PATENT DOCUMENTS

EP    1016963 A    7/2000

(Continued)

OTHER PUBLICATIONS

Del Bimbo et al., "Blackboard-Based Concurrent Object Recognition Using an Object-Oriented Database," 1992, IEEE, p. 172-180.*

(Continued)

*Primary Examiner*—Wei Y Zhen  
*Assistant Examiner*—Qing Chen  
(74) *Attorney, Agent, or Firm*—Finnegan, Henderson, Farabow, Garrett & Dunner LLP

(57) ABSTRACT

The invention relates to an object-oriented technique for representing and accessing application data that is arranged in hierarchical relationships. In a first step classes are provided including a hierarchy base class with methods for accessing hierarchical relationships, at least one hierarchy subclass that is derived from the hierarchy base class, and at least one application class. In a next step objects are instantiated including at least one hierarchy object of the at least one hierarchy subclass and at least one application object of the at least one application class. In a final step, each application object is linked to at least one hierarchy object, and vice versa, to provide access to the application data.

17 Claims, 9 Drawing Sheets

U.S. PATENT DOCUMENTS

| | | |
|---|---|---|
| 2004/0249809 A1 | 12/2004 | Ramani et al. |
| 2005/0261828 A1 | 11/2005 | Crowder et al. |
| 2006/0015830 A1 | 1/2006 | Schwarzmann |
| 2006/0020789 A1 | 1/2006 | Gipps et al. |

FOREIGN PATENT DOCUMENTS

| | | |
|---|---|---|
| WO | WO 97/15003 A | 4/1997 |
| WO | WO 02/054332 A | 7/2002 |

OTHER PUBLICATIONS

Gamma et al., "Design Patterns: Elements of Reusable Object-Oriented Software," Addison-Wesley Professional Computing Series, 1995, Table of Contents and pp. 331-344.

Behrens, Jochen et al., "Hierarchical Routing Using Link Vectors," INFOCOM '98, Seventeenth Annual Joint Conference on the IEEE Comput. and Comm. Societies, San Francisco, CA, IEEE, 1998, pp. 702-710.

Guzolek, John et al., "Real-Time Route Planning in Road Networks," Vehicle Navigation and Information Systems Conference, Toronto, CA, IEEE, 1989, pp. 165-169.

Jung, Sungwon et al., "HiTi Graph Model of Topographical Road Maps in Navigation Systems," Proceedings of the Twelfth International Conference, New Orleans, LA, IEEE Computer Society, Feb. 1996, pp. 76-84.

Koskas, Michel, "A hierarchical Algorithm to Solve the Shortest Path Problem in Valued Graphs," Oct. 10, 2003, retrieved from the Internet: http://arxiv.org/PScache/cs/pdf/0310/0310019.pdf, pp. 1-19.

EPO Communication and Search Report for European Patent Application No. 04016604 (filed Jul. 14, 2004), dated Mar. 30, 2005, 8 pages.

EPO Communication and Search Report, dated Oct. 17, 2005 (12 pages).

* cited by examiner

SYSTEMS, METHODS, AND ARTICLES OF MANUFACTURE FOR HANDLING HIERARCHICAL APPLICATION DATA

RELATED APPLICATIONS

This application claims the benefit of European Patent Application No. 04016604.3, filed Jul. 14, 2004, the content of which is expressly hereby incorporated by reference in its entirety.

BACKGROUND

1. Technical Field

The invention relates to the technical field of efficiently handling hierarchical application data. More particularly, the invention relates to an object-oriented programming technique that provides efficient approaches for dealing with hierarchical application data without resorting to multiple inheritance or partial interface implementation.

2. Background Information

Hierarchical application data need to be processed in a variety of different contexts. As an example the generation of transportation models for computer-implemented processing tasks such as transportation route optimization can be mentioned.

Transportation models help to solve problems relating to the transportation of tangible and intangible objects. Tangible objects such as fluids have to be transported via pipeline systems. Goods such as construction material require transportation between remote geographical places across a network of ground, air and sea ways. Intangible objects like electrical signals have to be transported for example within the highly complex wiring system in an airplane. Other intangible objects such as information in the form of electronic mail are sent across the World Wide Web via a plurality of intermediary routers.

Transportation routes have to be planned taking into account prevailing transportation constraints (such as network bandwidth, pipeline diameter, availability of transportation means, hubs and links, etc.). Additionally, transportation routes have to be optimized to save resources (e.g., to reduce the number of intermediary components involved in a particular transportation task, to reduce transportation duration, etc.). Both of these constraints add to the complexity of a particular transportation problem.

In order to deal with complex transportation data, a representation of the transportation data in a well-organized hierarchical data structure is desirable. Such a hierarchical data structure usually includes two or more hierarchy levels. On a lower level, for example, locations may be defined by references such as (geographical) coordinates or individual Internet protocol (IP) addresses. On a higher level, zones that include zero, one or more locations may exist. Such zones may stretch over a coordinate range or a set of IP addresses.

Object-oriented programming languages are suitable to implement such hierarchical relationships and associated generic algorithms. However, depending on the particular programming language, several problems may be encountered. If, for example, the programming language does not support multiple inheritance, then application classes cannot simultaneously be derived from both an application base class that provides basic application functionalities and a hierarchy base class that provides hierarchical functionalities. If the application base class already exists, its replacement is often not only unwanted, but also technically impossible. In programming languages, which do not allow partial implementation of interfaces, the implementation of an interface, which declares hierarchical functionality, requires each application class to implement most of the hierarchical functionality identically. This requirement not only puts a high implementation load on the application side, but it also leads to massive code duplication. This factor is critical in view of maintenance.

An objective of the present invention is to increase programming flexibility and to avoid code duplication when hierarchical application data have to be handled. Another objective is to provide an alternative to multiple inheritance or partial implementation of interfaces.

SUMMARY

According to one aspect of the present invention, a method for flexibly storing and representing hierarchical application data is provided. The method comprises the steps of providing a plurality of classes (e.g., in the form of program code), including a hierarchy base class with functionalities for accessing hierarchical relationships, at least one hierarchy subclass that is derived from the hierarchy base class, and at least one application class, instantiating objects (e.g., in a working memory) including at least one hierarchy object of the at least one hierarchy subclass and at least one application object of the at least one application class, and linking each application object to at least one hierarchy object, and vice versa, such that hierarchically related application objects have access to each other via the functionalities provided by the hierarchy base class without being derived therefrom.

This approach simplifies the application by shifting the inherent complexity of the hierarchy from the application classes to the hierarchy subclasses. This approach allows the flexible combination of functionalities provided by the hierarchy base class with functionalities provided by the application class (or by any application base class from which the application class has been derived). As instantiated application and hierarchy objects are linked, this functionality can still be used or even extended on an application side. This design overcomes the drawbacks of object-oriented programming languages that neither provide multiple inheritance nor partial implementation of interfaces. In particular, the invention does not require the redesign of existing application classes due to the lack of multiple inheritance functionality. Moreover, massive code duplication is avoided, as different application classes do not have to identically implement the hierarchical methods. This feature reduces the implementation load on the application side and facilitates maintenance. While the positive effects of the invention are particularly pronounced if the invention is realized with a programming language that neither allows multiple inheritance nor partial implementation of interfaces, the inventive approach can also be practiced (as an alternative to multiple inheritance or partial interface implementation) using programming languages that do support these functionalities.

The hierarchy base class may not be associated (in an object-oriented sense) with any other class but itself. The hierarchy base class can thus be provided without using references to other classes.

The functionalities provided by the hierarchy base class for accessing hierarchical relationships may include methods for maintaining and evaluating parent-child relationships. Accordingly, methods may be provided that allow for the determination for a given hierarchy object, any (zero, one or more) objects that are directly or indirectly related with the given object within a hierarchy. The hierarchy may be of a tree type or any other type that permits the association of objects on one hierarchy level (parents) with zero, one or more objects on a lower hierarchy level (children), and vice versa. If the levels of the associated objects are neighboring, then one is a direct parent or a direct child of the other, respectively. The hierarchy base class may further include attributes for storing these parent-child relationships.

The step of linking each application object to at least one hierarchy object, and vice versa, may comprise linking by reference. In one variation, the step of linking each application object to at least one hierarchy object, and vice versa, is based on at least one attribute on either side for storing the references to the one or more counterparts.

From the hierarchy base class one, two or more types of hierarchy subclasses may be derived. Each hierarchy subclass may provide additional functionalities to those already provided by the hierarchy base class. At least two objects of the one or more hierarchy subclasses may be hierarchically related to each other. This hierarchical relationship between the hierarchy subclass objects may be of the parent-child type or of any other type.

Two or more application objects may hierarchically be related to each other by the hierarchical relationship their associated hierarchy objects build up with one-directional or mutual references. An object of any hierarchy subclass may, for example, store references to objects of the same or another hierarchy subclass in one or more of the attributes the hierarchy subclass inherits from the hierarchy base class. A first object of any application class has access to a hierarchically related second object of the same or another application class after at least one of the hierarchy objects linked to the first object stores a reference to at least one of the one or more hierarchy objects linked to the second object.

In one variation, the hierarchy base class cannot (yet) be used directly. It may be implemented as an abstract class that delegates the implementation of the determination of at least one of the direct parents and the direct children. Different types of hierarchy subclasses may thus provide different determination methods. Depending on the particular implementation, information about direct parents and/or direct children for a given object may either be retrieved from a database or from a memory such as a random access memory. (Indirect) parents and children may be indirectly determined from the set of all direct parents or direct children by evaluating direct parent or direct children relationships over several hierarchy levels.

The hierarchy subclass may further supplement the functionalities for accessing hierarchical relationships of the hierarchy base class by additionally providing attributes specific for a particular application class. An application class may hide the functionalities of its hierarchy subclass, which includes the functionalities of the hierarchy base class. The one or more application classes may, for example, provide application functionalities for accessing parent-child relationships among application objects, which are implemented with the hidden interfaces of their corresponding hierarchy subclasses.

The one or more application classes may be a result of the application task, rather than a technical construct (such as the hierarchy base class). In other words, the application classes may include portions of the application logic. From a given application base class two or more application (sub)classes may be derived. In one variation, these two or more application classes may be hierarchically related to each other.

The method can be practiced in any application environment that requires flexible processing of hierarchically related application data such as data relating to the transportation of tangible or intangible objects. In a transportation context, the one or more application classes preferably define at least one of attributes and methods for transportation calculations such as transportation optimization. Transportation optimization can be performed in relation to various aspects including one or more of the following: transportation time, transportation distance, number of transportation hubs, transportation capacity, etc.

The application objects may have attributes for storing data relating to transportation routes. Transportation routes may be defined on different and/or multiple hierarchy levels such as locations (lower level) and zones (upper level), wherein a zone may comprise zero, one or more locations. For example, one of the application classes can be a location class. Each object of the location class may define a transportation location by specifying coordinates in a coordinate system and/or by an unambiguous location identifier (IP address, global unique identifier GUID, etc.). Additionally, an application class in the form of a zone class can be defined. Each zone object may have zero, one or more location objects as direct children. An object of the zone class may define a zone by specifying a coordinate space in a coordinate system or by an unambiguous zone identifier.

The invention may be practiced as a software solution, as a hardware solution or as a combination thereof. As regards a software solution, the invention relates to computer program product comprising program code portions for performing the steps of the invention when the computer program product is run on one or more computers. The computer program product may be stored on a computer readable recording medium.

As regards a hardware solution, a computer system for flexibly storing and representing hierarchical application data is provided. The computer system comprises a storage device for storing classes including a hierarchy base class with methods for accessing hierarchical relationships, at least one hierarchy subclass that is derived from the hierarchy base class, and at least one application class. Additionally the computer system comprises a processor for instantiating objects including at least one hierarchy object of the at least one hierarchy subclass and at least one application object of the at least one application class, wherein the processor links each application object to at least one hierarchy object, and vice versa, such that hierarchically related application objects have access to each other via the methods provided by the hierarchy base class without being derived therefrom.

The storage device of the computer system may include a program code storage device (such as a hard disk) for storing program code defining the various classes. Additionally, a temporary storage device (such as a random access memory, RAM) may be provided for storing the objects instantiated from the various classes.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described herein.

BRIEF DESCRIPTION OF THE DRAWINGS

The accompanying drawings are incorporated in and constitute a part of this specification and, together with the description, explain the principles of the invention. In the drawings.

DETAILED DESCRIPTION

In the following description, for purposes of explanation and not limitation, specific details are set forth, such as particular data models and processes utilized in connection therewith in order to provide a thorough understanding of the present invention. It will be apparent to one skilled in the art that the present invention may be practiced in other embodiments that depart from these specific details. In particular, while the different embodiments described herein below are incorporated into or used in conjunction with particular types of data storage, data representation, and hierarchical functionalities, it will be appreciated by the skilled artisan that the present invention is applicable to a wide variety of data storage types, data representation mechanisms, and hierarchical functionalities. Moreover, the invention will exemplarily be described with respect to a client/server computing approach. The invention is, however, not limited to such a computing approach. Where appropriate, the same reference numbers will be used throughout this detailed description in conjunction with the drawings to refer to the same or like parts.

One possible configuration in which the present invention can be carried out is the so-called three-tiered architecture, which separates a network system's components into three functional groups: presentation, application, and database. This is illustrated in FIG. 1 in a hardware-related view.

Figure 1:
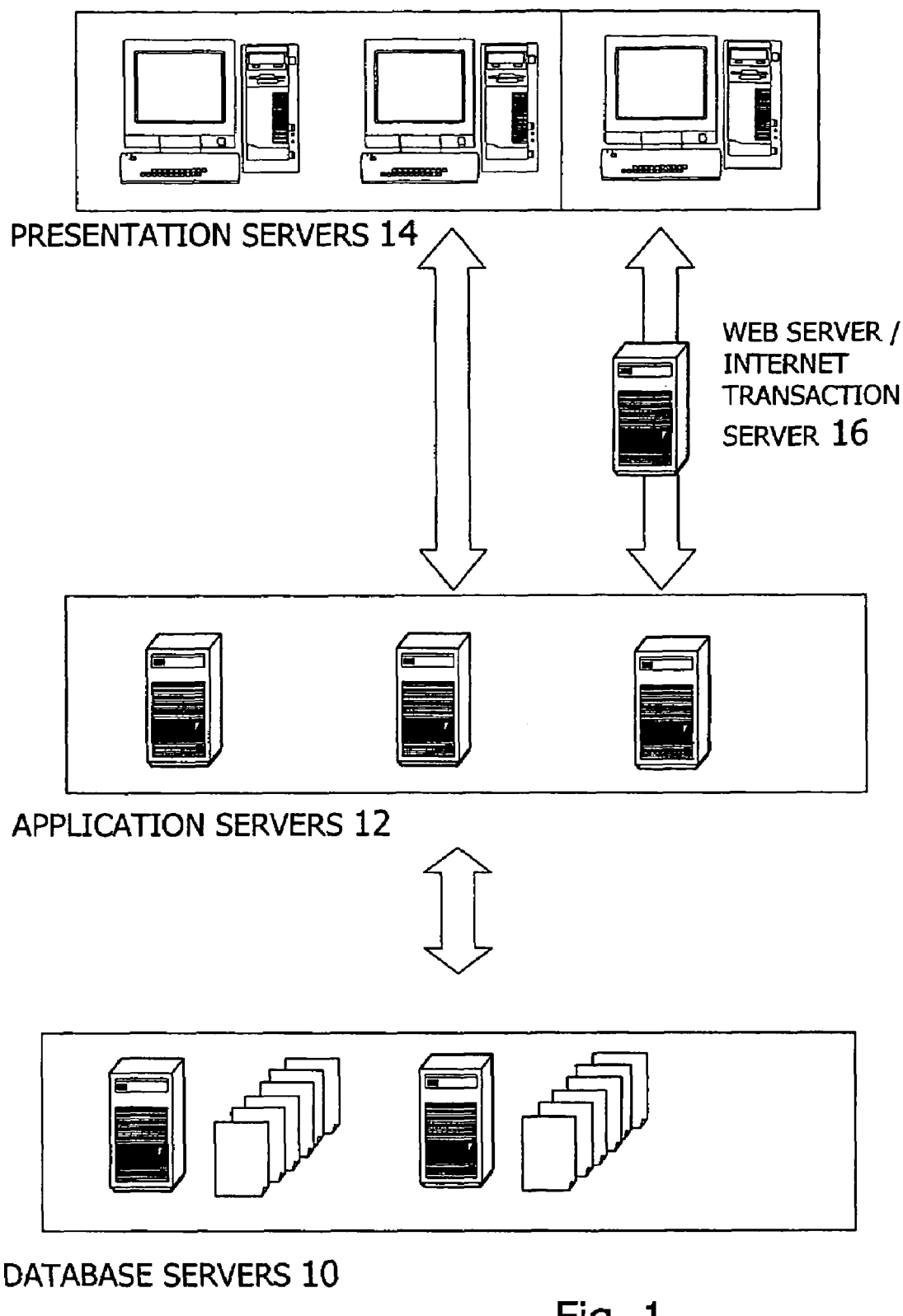
FIG. 1 is a schematic diagram illustrating a hardware-oriented view of a three-tiered client/server configuration in which the invention can be practiced.

With the three-tiered architecture shown in FIG. 1, each hardware group is configured to support demands of its functions. One or more database servers 10 on a bottom layer contain system databases. Application servers 12 on an intermediate layer interfacing the database servers 10 include the processing logic of the system with services such as spooling, dispatching user requests, and formatting data. The tasks related to data presentation are handled on a top layer by presentation servers 14, which are typically personal computers or workstations, enabling easy access to the system. External presentation servers 14 may be connected to the application servers 12 via the Internet and a Web server/Internet transaction server 16. Communication among the three tiers can be accomplished with the use of standard protocol services, such as the ones provided by TCP/IP or CPIC. CPIC stands for Common Programming Interface Communication and includes standard functions and services for program-to-program communication.

Figure 2:
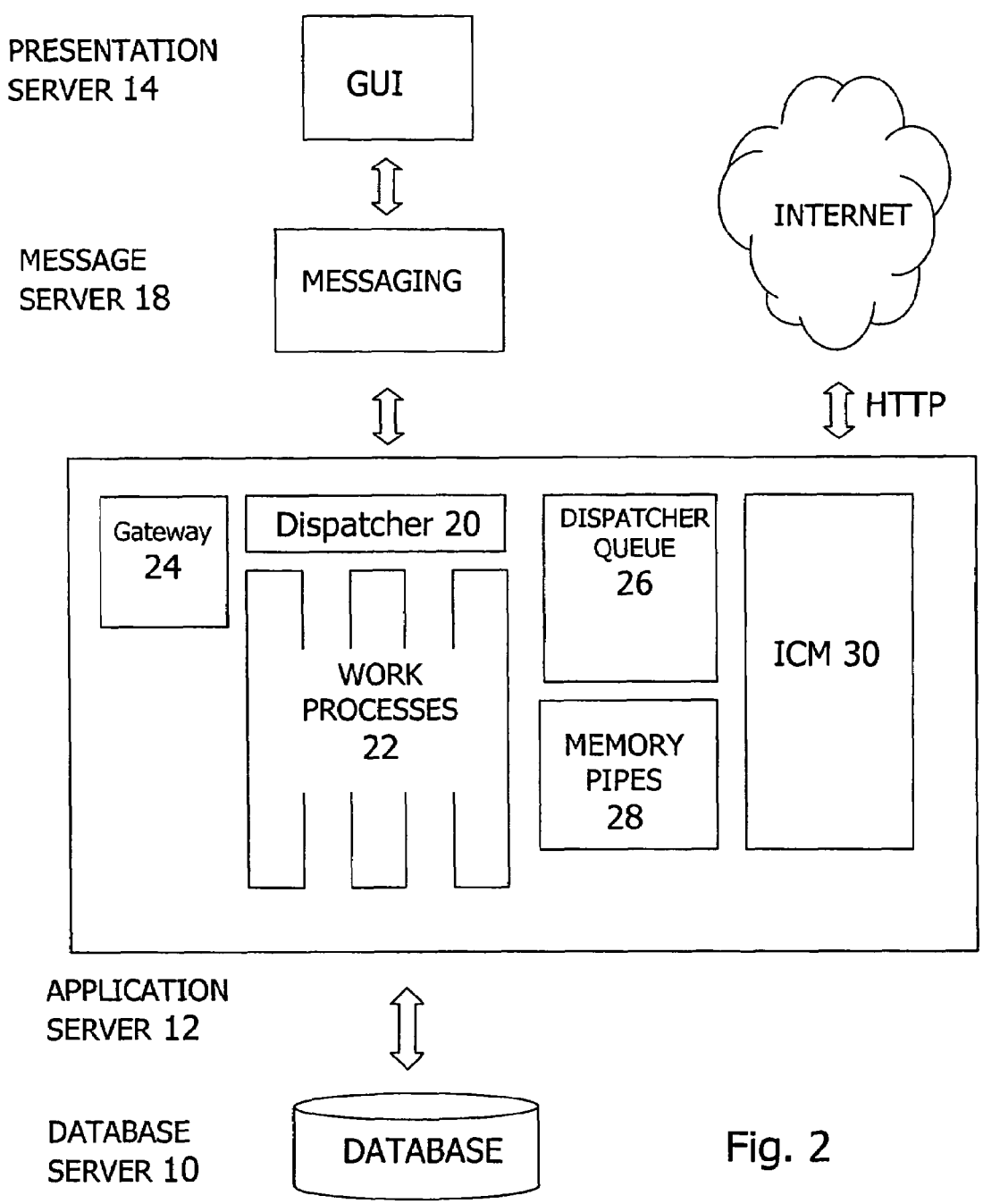
FIG. 2 is a schematic diagram illustrating a software-oriented view of a three-tiered client/server configuration of FIG. 1.

The three-tiered hardware architecture that is depicted in FIG. 1 is shown in FIG. 2 in a software-related view. As becomes apparent from FIG. 2, the software components used in context with the present invention include a graphical user interface (GUI) installed on each presentation server 14 of FIG. 1, an application component (or simply application) that runs on the application server 12 and a database component installed on database servers 10. The application component has interfaces to the database component, to the Internet and, via a messaging component installed on a message server 18, to the GUI. The message server 18 is a service used by different application servers 12 to exchange data and internal messages. The main tasks of the message server 18 include the transfer of messages and the distribution of workload between individual application servers 12.

The application running on the application server 12 includes a dispatcher 18 interfacing the message server 18 and one or more presentation servers 14 on the one hand and a plurality of parallel work processes 22 on the other hand. Each work process 22 has an interface to the database on the database server 10.

Furthermore, a gateway 24 is provided that may either be installed, from a hardware point of view, on the application server 12 or on a dedicated gateway server (not shown). The gateway service provided by the gateway 24 allows for a communication between different applications using the CPIC protocol. The function of the gateway 24 is to exchange large amounts of data between application servers, in contrast to the message server 18 which only exchanges brief internal and control messages. The application component depicted in FIG. 3 further includes dispatcher queues 26, memory pipes 28 and an Internet Communication Manager (ICM) 30, interfacing the Internet.

In the following the interrelation and cooperation among the individual software components depicted in FIG. 2 will be described in more detail.

As data is entered in the presentation server 14 (or otherwise generated), the data is received by the GUI, converted to a standard format, and sent via the messaging server 18 to the dispatcher 20. The connection between the GUI on the presentation server 14 and the dispatcher 20 is made with a protocol like DIAG, according to which small data packages are sent through the connecting network.

The dispatcher 20 checks whether there are work tasks that need to be processed. A complex workflow typically involves a plurality of such work tasks. If no work process 22 is available for processing a received work task, the work task is kept together with other tasks in the dispatcher queues 26 until a work process 22 becomes available.

Once a work process 22 becomes available, the dispatcher 20 sends the user data to the available work process 22. A work process 22 is a program in charge of executing the application tasks of the present invention. Each work process 22 acts as a specialized system service. From the point of view of an operating system, a group of parallel work process 22 as depicted in FIG. 2 makes up a runtime system. Each individual work process 22 includes a task handler, a processor, and a database interface (not shown).

The work process 22 may execute dialogue steps for the presentation server 14. These steps generally relate to the processing or display of a single GUI screen, which means that right after one work process 22 finishes the execution of a dialogue step for a user session, it is immediately available for use by another user session. For its processing, each dialogue step needs code, dictionary objects, and data. These elements may come from the database residing on the database servers 10 or from an internal memory of the application server 12. Within a dialogue step, a task handler (not shown) is in charge of assigning the corresponding tasks to the internal components (dialogue interpreter and processor), finally sending a SQL request to the database servers 10. The database servers 10 send the requested data back to the requesting work process 22, which in turn process it and passes it via the dispatcher 20 to the presentation server 14. The GUI on the presentation server 14 formats the requested data and builds up the screen for the user.

If during a particular work process 22 application data has to be exchanged with other applications such as legacy applications or external applications, the functionality of the gateway 24 is activated.

The ICM 30 allows the direct processing of HTTP requests coming from the Internet and/or a browser running on a presentation server 14, and for sending HTTP requests as HTTP client requests to the Internet. The ICM 30, which may be configured as a dedicated kernel process, uses threads to communicate as a server or as a client on the Internet. If an HTTP request is being processed by a work process 22, the memory pipes 28 are used for data transfer. The memory pipes 28 are located in a shared memory portion. In its Web client position a work process 22 creates an HTTP request which is sent to a Web server. It then receives the HTTP response and the work process 22 proceeds on the basis of the HTTP response.

The application running on the application server 12 of FIG. 2 is configured to process hierarchically related application data. In the present embodiment, hierarchically related application data in a transportation context will be considered. The application may, for example, perform transportation route optimization calculations that help to find the best path from a given starting point to a given end point. Starting and end points may be generated by the application itself. Alternatively, starting and end points are input via the GUI of the presentation server 14 and then transferred to the work processes 22 of the application server 12 as described above.

The source code of the application running on the application server 12 of FIG. 2 can be written in various programming languages. In the following it is assumed that the application is written in an object-oriented programming language that neither supports multiple inheritance nor the partial implementation of interfaces such as the object-oriented Advanced Business Application Programming Language (ABAP OO).

The application is programmed such that it works on objects of existing (i.e., previously programmed) application classes that often do not or not fully support hierarchical functionalities. Using programming languages such as Java or C++ that allow multiple inheritance, the straight forward approach would be to provide a hierarchy class with the required hierarchical functionalities and to derive an application subclass from both the hierarchy class and the one or more existing application classes. However, this approach of multiple inheritance is not available if programming languages such as ABAP OO are used. Instead, the existing application classes would have to be replaced with or adapted to new classes fully supporting the required hierarchical functionalities, thereby necessitating additional programming efforts. To avoid these and other technical drawbacks an approach as outlined in FIG. 3 is chosen.

Figure 3:
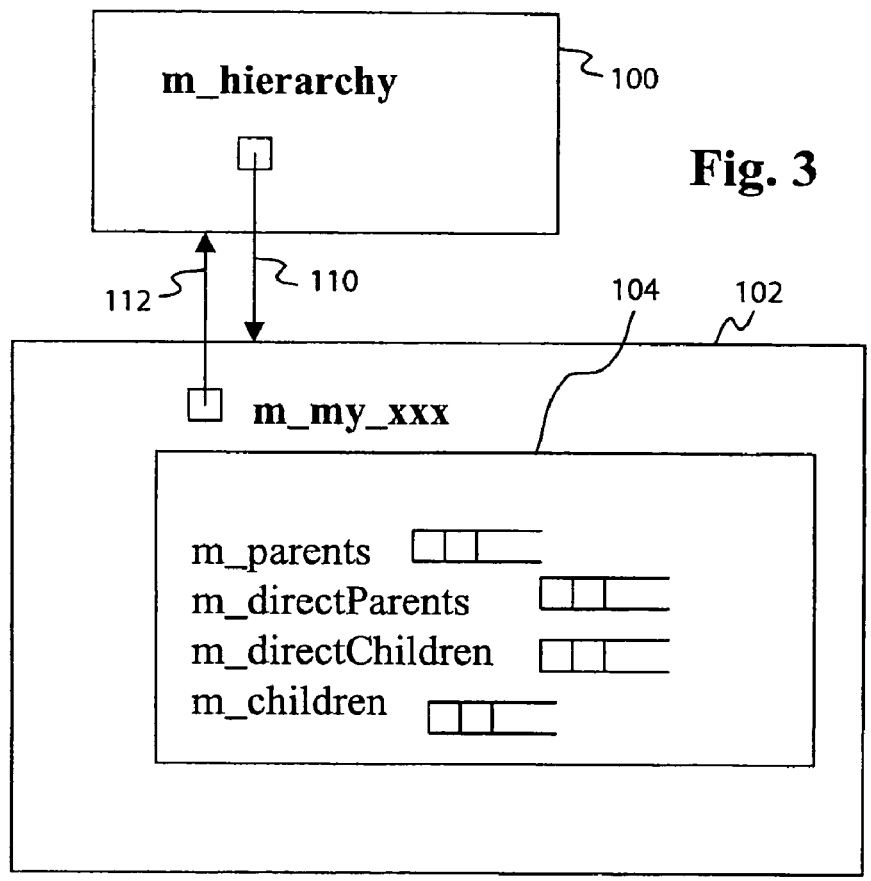
FIG. 3 is a schematic diagram illustrating a hierarchy entity in a detailed view.

In FIG. 3 a detailed view of a hierarchy entity diagram according to the invention is depicted. FIG. 3 shows an application object 100 instantiated from an application class (not shown) and a hierarchy object 102 instantiated from a hierarchy subclass (also not shown). Accordingly, application object 100 and hierarchy object 102 are not instantiated from a single class but from two distinct classes.

The pointers 110 and 112 (or any other referencing mechanisms) link the application objects 100 and 102 with each other. More specifically, each side has one or more attributes for storing pointers to the counterpart. The hierarchy pointer 110 of the application object 100 links the application object 100 with the associated hierarchy object 102, and the pointer 112 of the hierarchy object 102 links the hierarchy object 102 with the associated application object 100. The pointers 110, 112 thus lead from the application object 100 to the hierarchy object 102 and vice versa. In addition to the pointer 110 the application object may contain inter alia further attributes (not shown) required by the application for its processing task.

The hierarchy object 102 includes a hierarchy core object 104 belonging to the hierarchy base class (which provides the hierarchy related functionalities). The hierarchy core object 104 includes references to the hierarchy objects of at least some of the relatives of the application object 100. The references have been determined using the methods provided by the hierarchy base class. When the application needs to work with (or access) relatives of the application object 100, for example all direct parents of it, then the application calls one of its methods to return them. From the application point of view this is a simple and intuitive process. The entire complexity of the call is hidden from the application. The method itself accesses its hierarchy object through the corresponding pointer 110 with the request to return one of the hierarchy objects of each of these direct parents. Finally, the application objects, which represent the direct parents, are accessed through pointers similar to pointer 112 from the previously returned hierarchy objects. For instance, transportation route optimization (application) needs to work with all zones (direct parents) of an application object (location), because some of the transportation options may be maintained in aggregated form on zone level only.

In connection with the present example, the relatives of an application object are defined as its children and parents. The children of the application object 100 are related application objects on (one or more) lower hierarchy levels and the parents of the application object 100 are related application objects on (one or more) higher hierarchy levels. A particular application object may have zero, one or more children and zero, one or more parents.

Children of the application object 100 on a neighboring lower hierarchy level are called direct children. Parents of the application object 100 on a neighboring higher hierarchy level are called direct parents. If an application object is located on a hierarchy level with only one lower (higher) hierarchy level, its children (parents) are identical with its direct children (parents). The hierarchy core object 104 shown in FIG. 3 includes references to its parents, direct parents, children and direct children. If required, some or more of these references may be omitted or references to other relatives (such as references to "grandparents" on the second higher hierarchy level) may be added.

As becomes apparent from FIG. 3, the pointer 112 of the hierarchy object 102 is outside the hierarchy core object 104 (i.e., not provided by the hierarchy base class from which the hierarchy subclass is derived). The pointer 112 is only provided by the hierarchy subclass as it depends on the particular type of the corresponding application class. In other words, each particular type of hierarchy subclass may have its specific pointer (as each type of hierarchy object may point to a particular associated application object).

Figure 4:
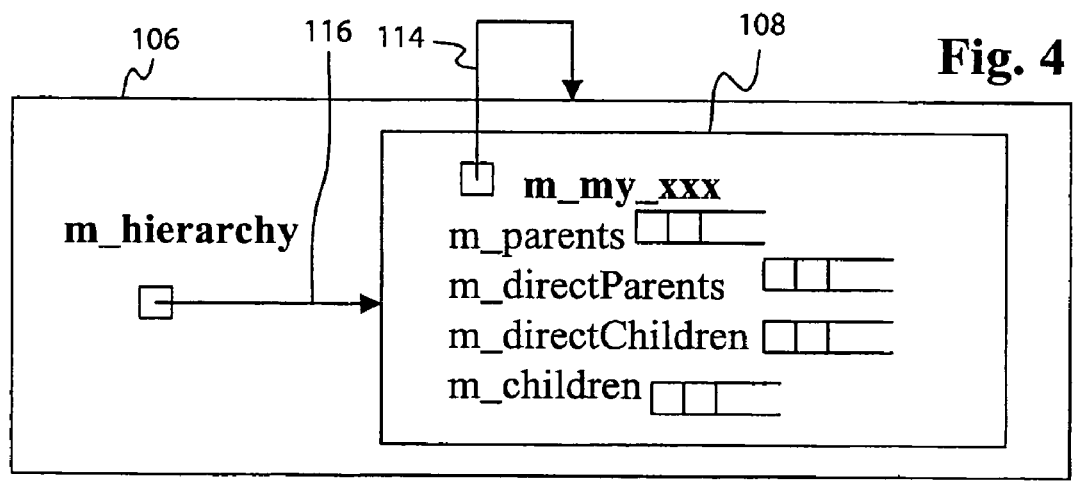
FIG. 4 is a schematic diagram illustrating a hierarchy entity in a packed view.

FIG. 4 shows in a packed view the same hierarchy entity that is depicted in FIG. 3. A simplified hierarchy object 108 (including the references provided by the hierarchy core object 104 of FIG. 3) is included in the application object 106. Pointers 114, 116 link the simplified hierarchy object 108 with the application object 106 and vice versa. The packed view of FIG. 4 facilitates the following description of a plurality of hierarchically related application objects shown in FIG. 5.

Figure 5:
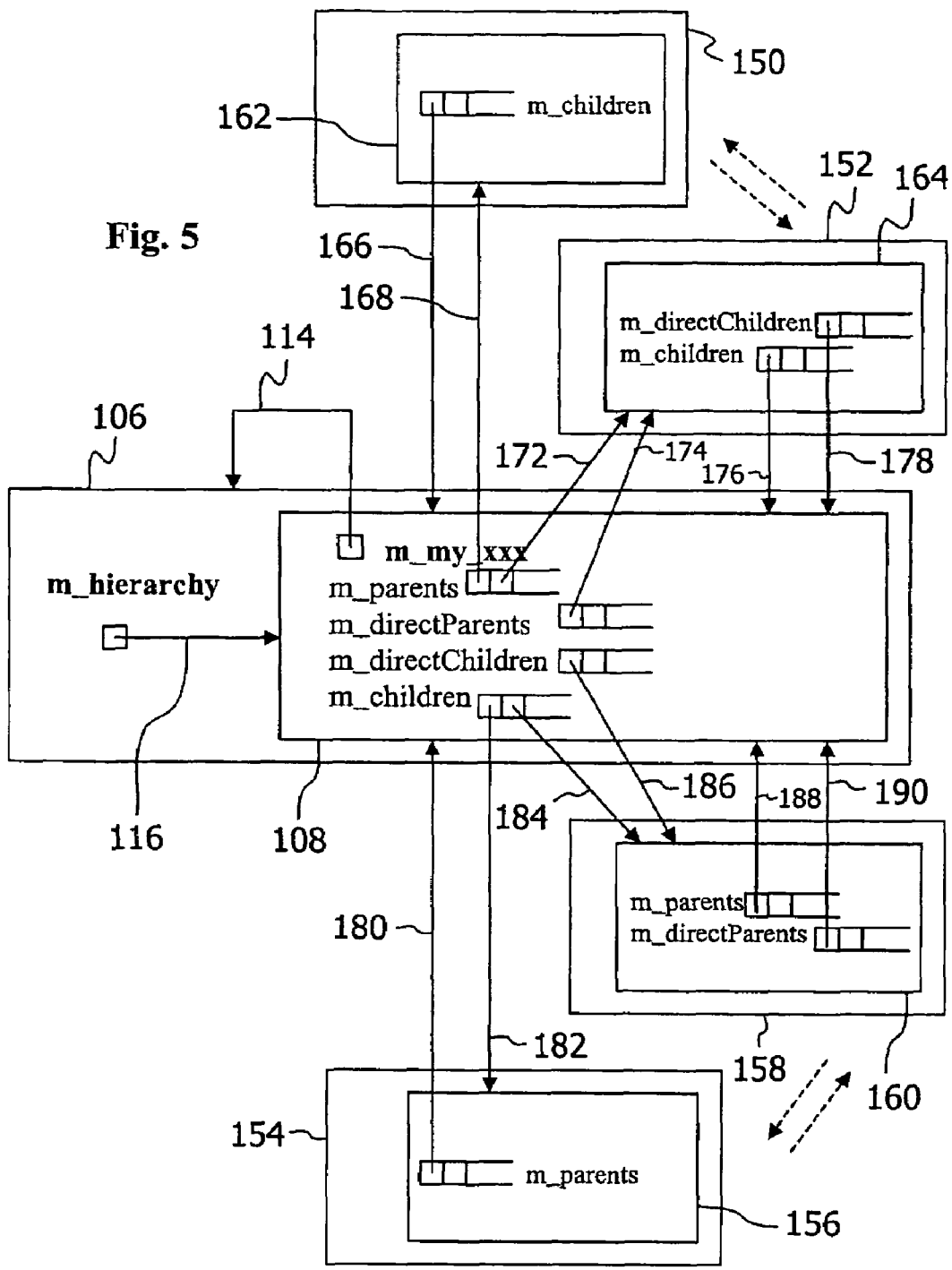
FIG. 5 shows the interdependence of several hierarchical entities in an illustrative object hierarchy.

In FIG. 5 an illustrative hierarchy scenario with five application objects 106, 150, 152, 154, 158 on five neighboring hierarchy levels is depicted. The application object 150 is located on the first (highest) hierarchy level, the application object 152 is located on the second hierarchy level, the application object 106 is located on the third hierarchy level, the application object 158 is located on the fourth hierarchy level, and the application object 154 is located on the fifth (lowest) hierarchy level. The five application objects 106, 150, 152, 154, 158 may differ from each other in that each application object is instantiated from a different application class (e.g., for each hierarchy level an associated application class may be provided). The different application classes may be derived from a single application base class.

The hierarchy scenario of FIG. 5 will now be described from the point of view of the application object 106 on the third hierarchy level. This application object 106 is linked with the four remaining application objects 150, 152, 154, 158 on higher and lower hierarchy levels, respectively, and can access these application objects 150, 152, 154, 158 via the references provided by its associated hierarchy object 108.

As becomes apparent from FIG. 5, the application object 106 has two parents (application objects 150 and 152) and two children (application objects 156 and 158). The application object 152 is a direct parent of the application object 106 as the application object 152 is arranged on the next higher hierarchy level (the fourth hierarchy level. Each direct parent is also a (simple) parent. Accordingly, the hierarchy object 164 of the application object 152 is referenced by the hierarchy object 108 linked (or otherwise associated) with the application object 106 both as parent and as direct parent. Corresponding references 172, 174 lead from the hierarchy object 108 of the application object 106 to a hierarchy object 164 of the application object 152. Likewise, the hierarchy object 108 of the application object 106 is referenced by the hierarchy object 164 linked with the application object 152 both as child and as direct child. Corresponding references 176, 178 lead from the hierarchy object 164 of the application object 152 to the hierarchy object 108 of the application object 106.

The application object 150 on the highest level is a (simple) parent of the application object 106 and the latter is a (simple) child of application object 150. Corresponding references 166, 168 lead from the hierarchy object 108 of the application object 106 to a hierarchy object 162 of the application object 150 and vice versa. Of course, a (direct) parent-child relationship also exists between the two application objects 150 and 152 on the first two levels (dashed arrows).

As the hierarchical relationship between the application object 106 and its children 154, 158 simply mirrors the relationship to its parents 150, 152, a more detailed description of the corresponding references can be omitted.

As becomes apparent from FIG. 5, the five application objects 106, 150, 152, 154, 158 are hierarchically related by their linked hierarchy objects that reference each other. This relationship means that the application object 106 has access to a hierarchically related further application object (of the same or another application class) after the hierarchy object linked to the application object 106 stores a reference to the (at least one) hierarchy objects linked to the further application object.

Figure 6:
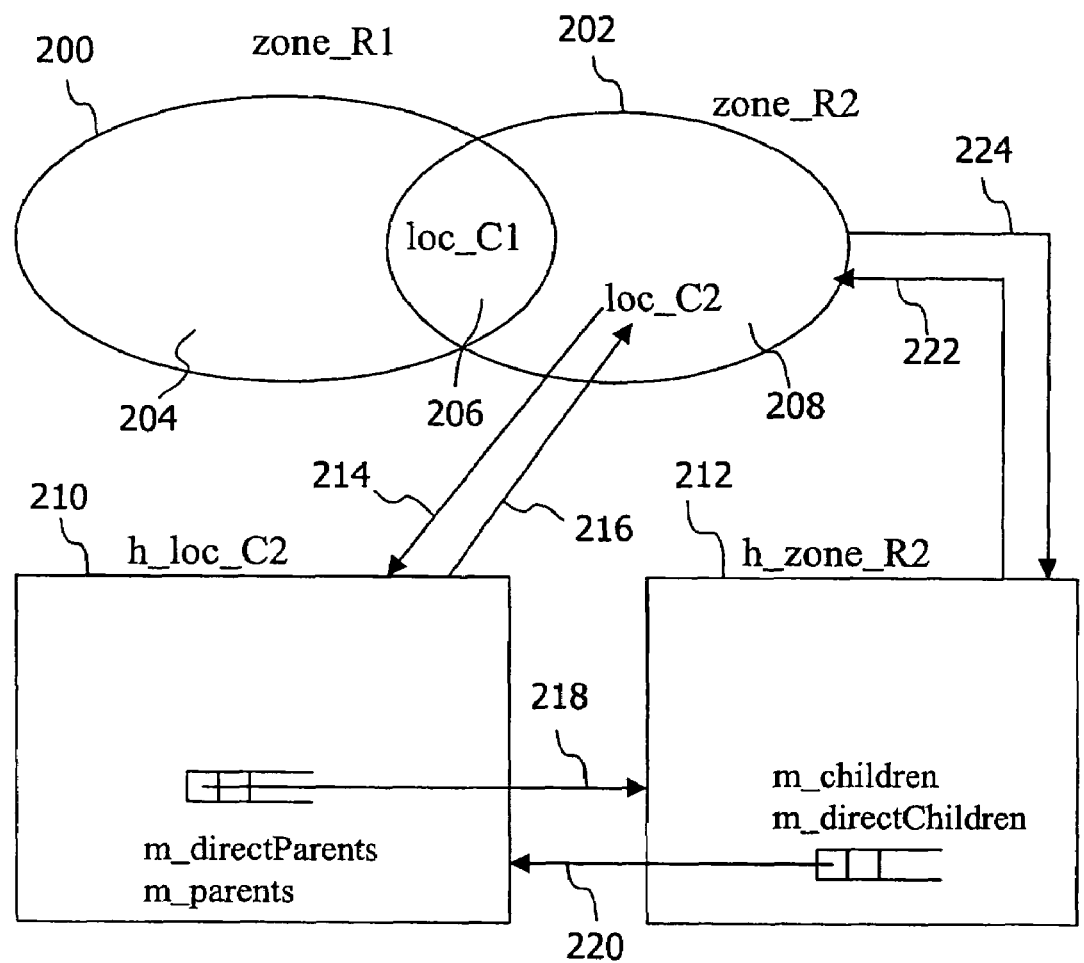
FIG. 6 is a schematic diagram illustrating an example with two zones and with two locations in a partial object representation.

Having generally described possible hierarchical relationships among the application objects in connection with FIG. 5, a more specific example is provided with reference to FIG. 6. The example depicted in FIG. 6 relates to a hierarchical scenario common to many types of transportation models. Transportation models usually describe possible paths from a starting point to an end point via a plurality of possible intermediate points. The main task of transportation route optimization calculations is typically to find suitable intermediate points (that may be defined on different hierarchy levels) such that certain transportation constraints such as quality of service, transportation duration, etc. are satisfied. From a programming (and application) standpoint, the individual points (also called states) spanning the transportation model may be implanted using appropriate application class definitions.

In the two-level hierarchical scenario shown in FIG. 6, application objects on a higher level are called "zones" (or zone objects) and can represent a range or set of IP addresses, a geographical region, a bundle of pipelines or wires and the like. Application objects on a lower level are called "locations" (or location objects) and can represent an individual IP address, a geographical point, a single pipeline or wire and the like. Zone objects and location objects can be instantiated from two dedicated classes (i.e., a zone class and a location class that may or may not be derived from a single base class). Note that in the two-level hierarchy of FIG. 6 each parent is automatically a direct parent and each child a direct child. This relationship that parents and direct parents as well as children and direct children coincide.

As shown in the upper half of FIG. 6, the hierarchy scenario includes two "overlapping" zone objects 200 (zone R1) and 202 (zone R2) as well as two location objects 206 (loc_C1) and 208 (loc_C2). Location object 208 "belongs" to zone object 202 only (i.e., is a direct child thereof), whereas location object 206 "belongs" to both zone objects 200, 202 (i.e., both zone objects 200, 202 are direct parents thereof).

In the following, zone object 202 and one of its associated location objects (namely location object 208) will be described in further detail.

The location object 208 is linked with a location hierarchy object 210 (h_loc_C2), and vice versa, via corresponding pointers 214, 216. Likewise, the zone object 202 is linked with a zone hierarchy object 212 (h_zone_R2), and vice versa, via corresponding pointers 222, 224. This linking means that if calculations in context with transportation route optimization require the determination of one or more relatives of the zone object 202 or the location object 208, the pointers 214, 224 lead to the respectively linked hierarchy object 210, 212. Once the linked hierarchy object 210, 212 has been found, the references included therein allow for the determination (and, if necessary, to access) of the hierarchy objects of the requested relatives. This configuration means, in the example shown in FIG. 6 that if the relatives for the location object 208 have to be retrieved, the pointer 214 will lead to the associated location hierarchy object 210 and from there a reference 218 will lead to the zone hierarchy object 212.

Figure 7:
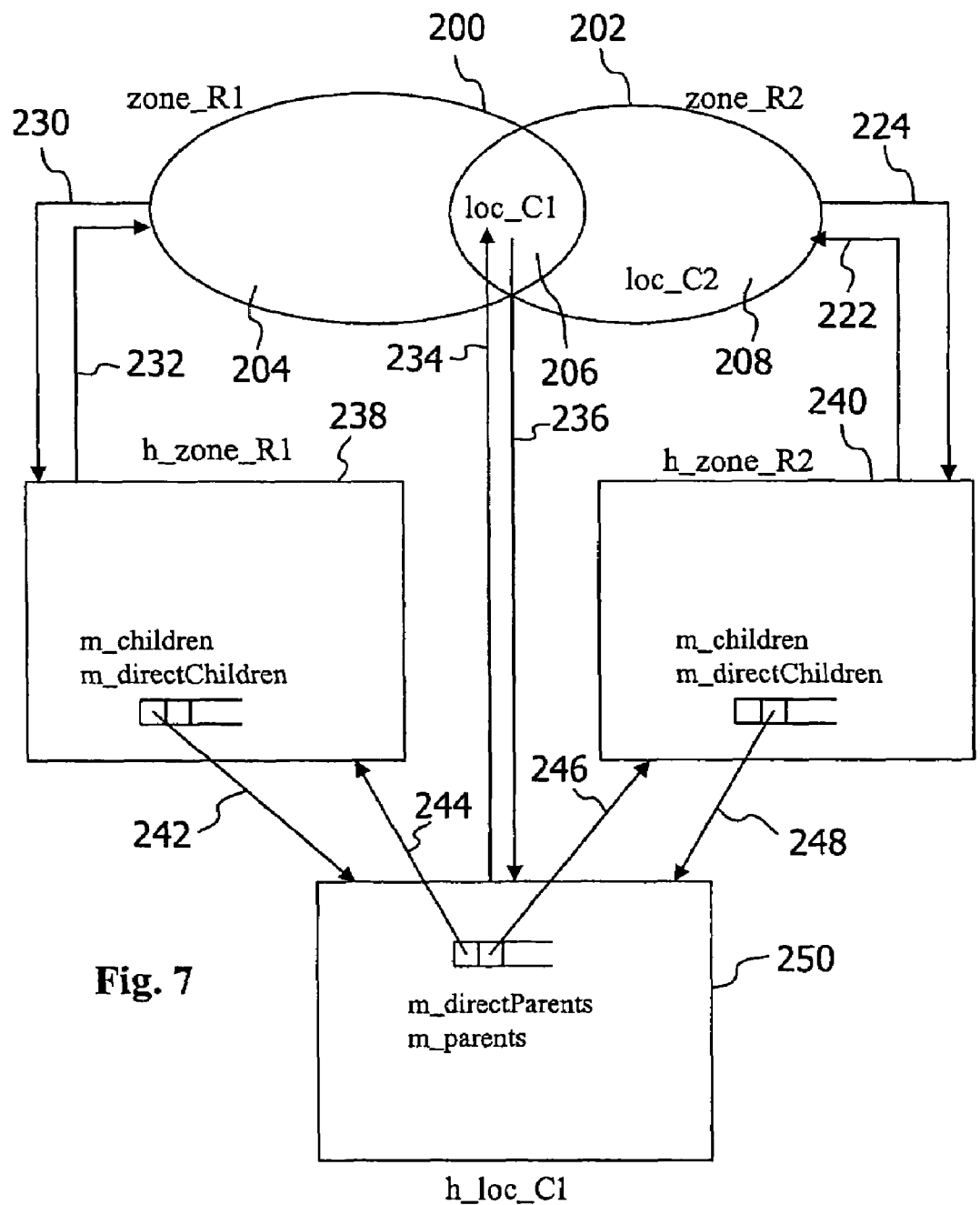
FIG. 7 is another diagram of the example of FIG. 6 illustrating the object representation of the first location.

Whereas FIG. 6 has been described in relation to the location object 208 that hierarchically related to a single zone object 202, FIG. 7 extends the hierarchical scenario of FIG. 6 with respect to the location object 206 that is hierarchically related to two zone objects 200, 202. As becomes apparent from FIG. 7, a location hierarchical object 250 of the location object 206 has references 244, 246 to respective zone hierarchical objects 238, 240 of both zone objects 200, 202.

In the hierarchical scenarios of FIGS. 6 and 7 it has (silently) been assumed that the zone objects 200, 202 encompass their locations without order. This assumption allowed a 1:1 relationship between the location object 206 and the associated location hierarchy object 250. If the assumption of non-ordered location objects is given up, a 1:n relationship may result.

Figure 8:
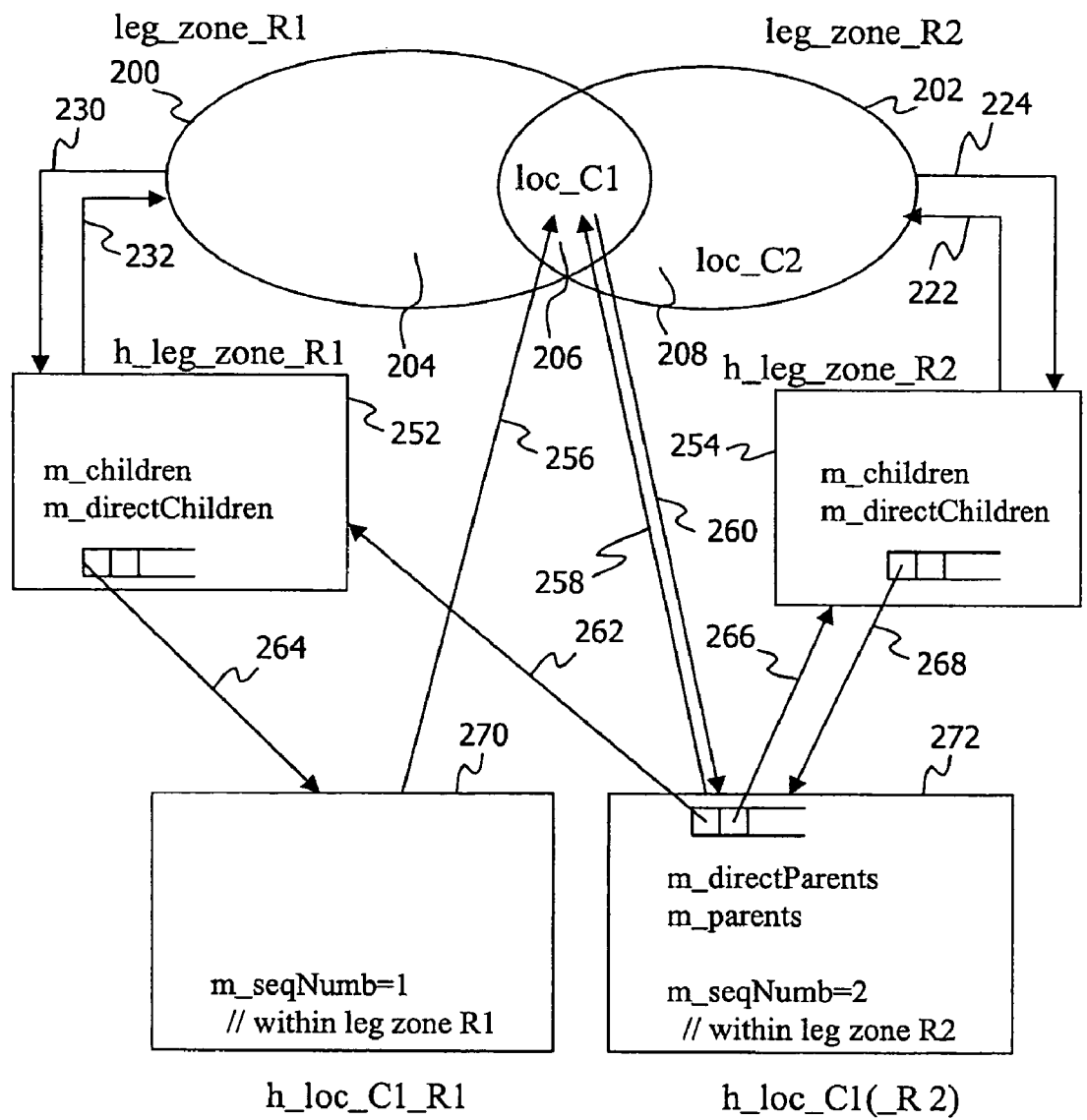
FIG. 8 is yet another diagram of the example of FIG. 6 illustrating the object representation of the first location with its relationships to the two zones R1 and R2 if these zones store their locations as a sequence and not as a set.

FIG. 8 schematically shows a 1:2 relationship between the location object 206 and associated location hierarchy objects 270, 272. The two location hierarchy objects 270, 272 in this scenario allow for the representation of the location 206 to be seen as the first, second location (according to the values of the attribute m_seqNumb) of the zone objects 200, 202, respectively. The two location hierarchy objects 270, 272 are required to differentiate between accesses from the two zone hierarchy objects 252, 254. Note that no such differentiation is required when the zone hierarchy objects 252, 254 are accessed via the location hierarchy object 272.

Figure 9:
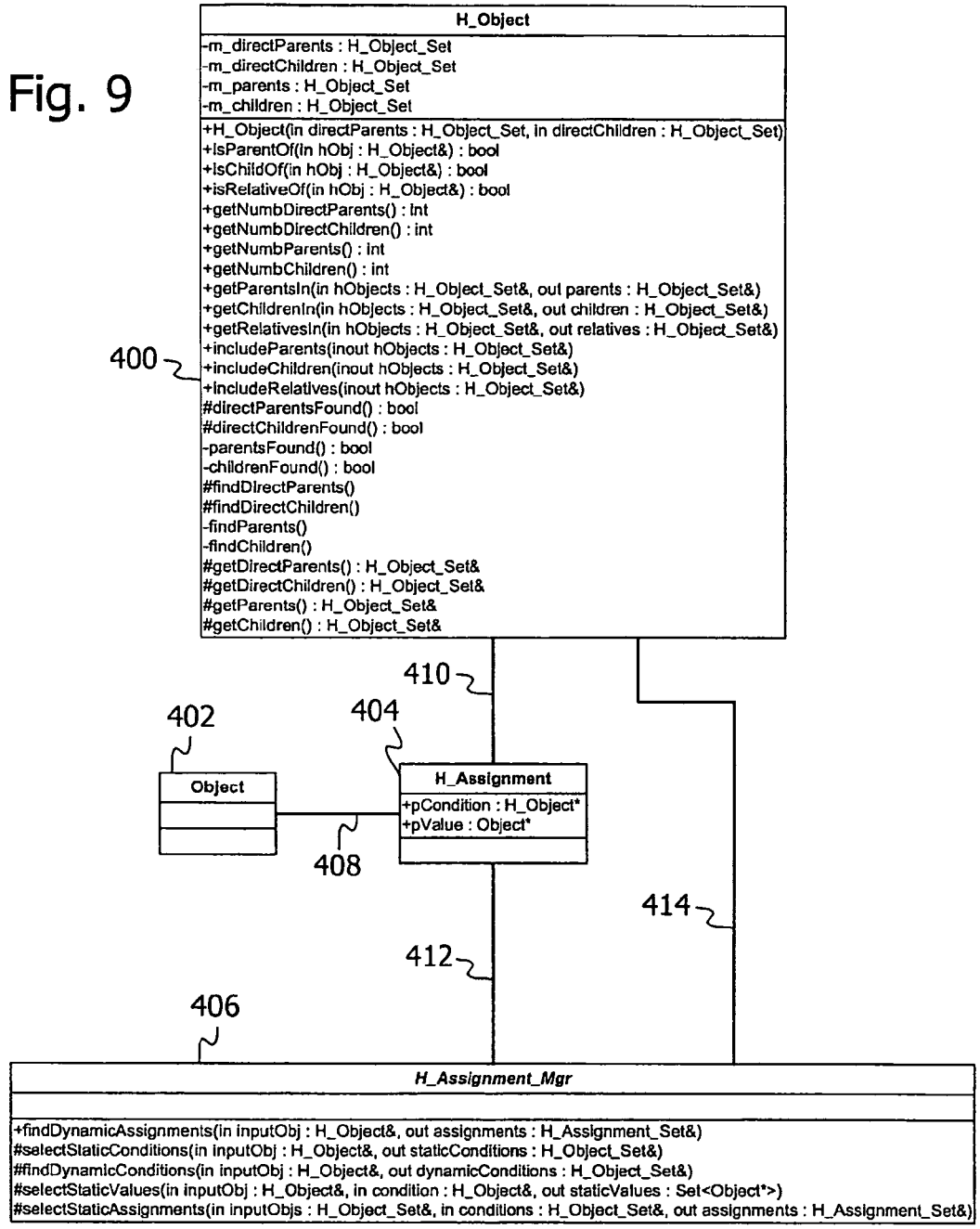
FIGS. 9 and 10 are UML diagrams of classes that may be utilized in context with the present invention.
Figure 10:
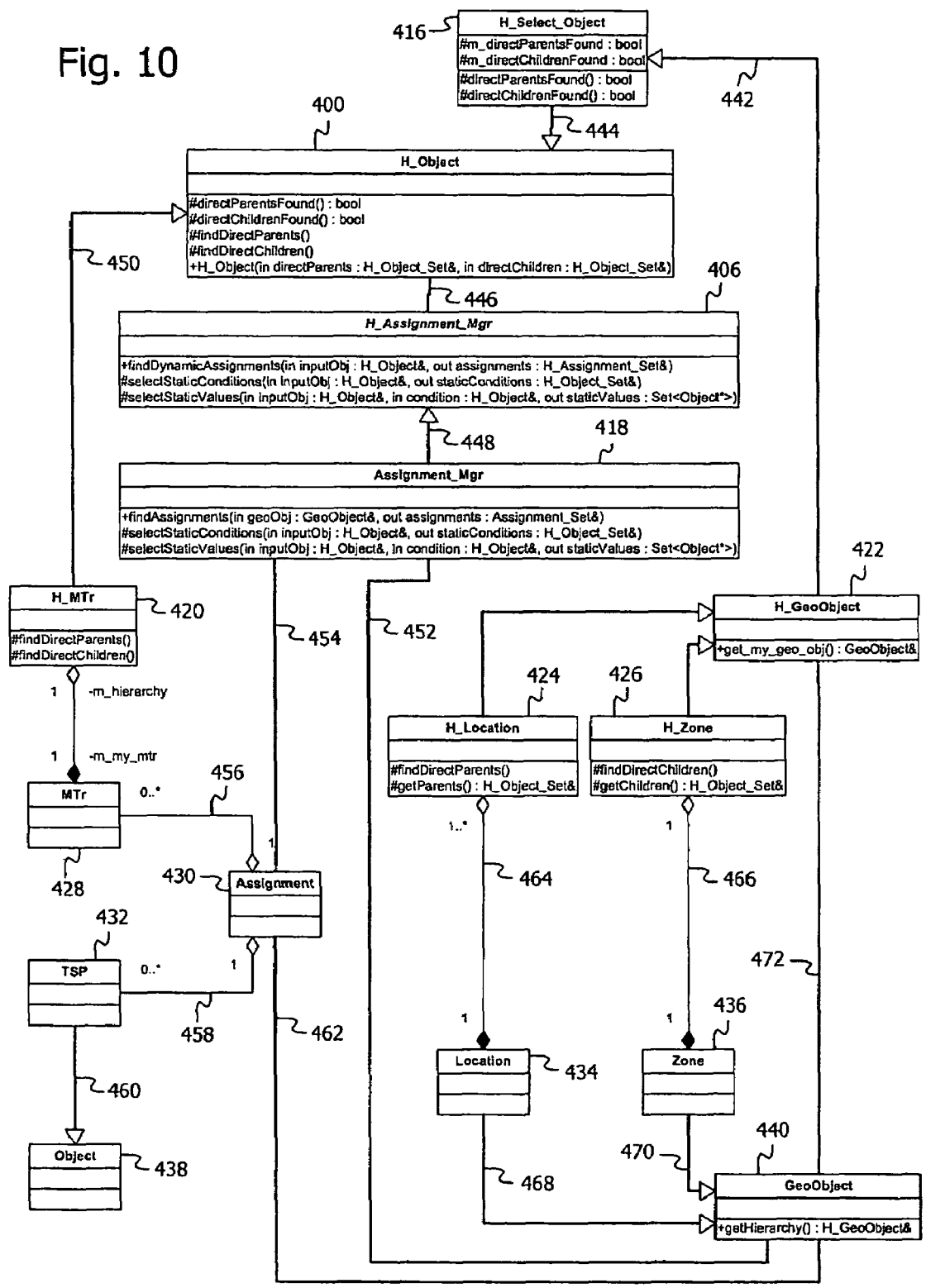

In FIGS. 9 and 10 UML (Unified Modeling Language) diagrams of parts of object-oriented class diagrams according to the invention are shown. Standard UML labeling is used. The class diagrams of FIGS. 9 and 10 may be implemented in context with the hierarchy entities and hierarchy scenarios shown in FIGS. 3 to 8.

Referring to FIG. 9, a hierarchy base class 400 (H_Object) that is not using or associated (in an object-oriented sense) with any other class encapsulates attributes including m_directParents, m_directChildren, m_parents, m_children for storing and methods for maintaining and determining hierarchical (parent-child) relationships. Further, it provides methods for accessing and evaluating hierarchical relationships. The functionality of the hierarchy base class 400 is implemented with and thus based on the protected and polymorphic methods findDirectParentso and findDirectChildreno. The subclasses derived from the hierarchy base class 400 only need to implement these methods to capitalize on hierarchical functionalities like is ParentOf( ).

Hierarchy base class 400 is used by (associations 410, 414) a class 404 (H_Assignment) and a further class 406 (H_Assignment_Mgr). The classes 404 and 406 play a role in the application context of dynamically assigning combinations of means of transportation (such as network links with different capacities, pipeline with different diameters, different vehicles) and transportation service providers to individual transportation hubs or routes. Such assignments are typically evaluated by transportation route optimization mechanisms to meet specific optimization criteria. Class 402 (Object) is the base class of all classes in ABAP.

In the UML diagram of FIG. 10, some of the classes shown in the UML diagram of FIG. 9 reappear in a simplified form and will thus not be explained in more detail. The class definitions shown in FIG. 10 basically correspond to the zone/location based hierarchy scenarios of FIGS. 5 to 8.

The hierarchy base class 400 is a generalization of hierarchy subclass 420 (H_MTr), whose objects are linked to objects of an application class 428 (MTr) relating to (hierarchically structured) transportation means. The hierarchy subclass 420 thus provides hierarchical functionalities (including those of the hierarchy base class 400) for the application class 428. As described above with reference to FIG. 9, both the application class 428 relating to transportation means and a (non-hierarchal) application class 432 (TSP) relating to transportation service providers are associated with a further application class 430 (Assignment) relating to transportation assignments (MTr,TSP).

As can be determined from FIG. 10, a further hierarchy subclass 416 (H_Select_Object) is derived from the hierarchy base class 400. The further hierarchy subclass 416 functions as base class for all hierarchy classes which do not provide the relatives (parents and children) at construction time but which select them from the database upon request. If desired the first hierarchy subclass 416 can simply be omitted.

From the hierarchy subclass 416, a further hierarchy subclass 422 (H_GeoObject) is derived. From this hierarchy subclass 422, on the other hand, two different further hierarchy subclasses, namely the location hierarchy subclass 424 (H_Location) and the zone hierarchy subclass 426 (H_Zone) are generated. In the two-level hierarchy scenario described above with reference to FIGS. 5 to 8, the location hierarchy subclass 424 need only implement the parent-related functionalities whereas the zone hierarchy subclass 426 need only implement the child-related functionalities. Accordingly, the location hierarchy subclass 424 and the zone hierarchy subclass 426 only partially use the functionalities of the hierarchy subclass 422 (H_GeoObject).

As already mentioned in context with FIGS. 5 to 8, the location hierarchy subclass 424 is linked with the location class 434 (application class "Location") and the zone hierarchy subclass 436 is linked with the zone class 436 (application class "Zone"). Both application classes 434, 436 are derived from the application base class 440 (GeoObject) that provides common geographical and application-specific functionalities.

As has become apparent from the above, an application class with hierarchical functionalities is not deriving from the hierarchy base class directly but rather, is deriving from a hierarchy subclass. More precisely, each application object possesses a hierarchical object for the storage and retrieval of all related application objects. The hierarchical object is not storing related application objects, but the hierarchical objects of the related application objects (or references thereof).

This approach provides programming functionalities comparable to those of multiple inheritance and partial implementation of interfaces without resorting to these functionalities themselves. Languages such as ABAP, which do not provide these functionalities, are thus freed from the burden of requiring each application class to implement most of the hierarchical functionality identically. This reduces the implementation load on the application layer, avoids massive code duplication and is uncritical with respect to software maintenance and efficient memory usage.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for representing and accessing related application data that is stored in memory of a server and is arranged in hierarchical relationships, the method being executed by the server and comprising:
providing classes including:
a hierarchy base class providing at least one hierarchical functionality related to the hierarchical relationships;
at least one hierarchy subclass that is derived from the hierarchy base class; and at least one application class for the application data, wherein the at least one application class defines at least one of attributes and methods in a transportation optimization context;

instantiating objects including:
- a first application object of the at least one application class;
- a second application object of the at least one application class, wherein the second application object is different from the first application object;
- a first hierarchy object of the at least one hierarchy subclass; and
- a second hierarchy object of the at least one hierarchy subclass, wherein the second hierarchy object is different from the first hierarchy object;

linking, by using a processor of the server, the first application object to the first hierarchy object, and the second application object to the second hierarchy object;

providing a first reference to the first hierarchy object for use by the at least one hierarchical functionality, the first reference referencing the second hierarchy object;

providing a second reference to the second hierarchy object for use by the at least one hierarchical functionality, the second reference referencing the first hierarchy object; and relating the first application object and the second application object by using the first hierarchy object and the second hierarchy object, wherein the first application object accesses application data stored in the second application object by implementing the at least one hierarchical functionality using the first reference to link the first hierarchy object to the second hierarchy object to access the second application object via the second hierarchy object, and wherein the second application object accesses application data stored in the first application object by implementing the at least one hierarchical functionality using the second reference to link the second hierarchy object to the first hierarchy object to access the first application object via the first hierarchy object.

2. The method of claim 1, wherein the hierarchy base class is not using any other class but itself.

3. The method of claim 1, wherein the at least one hierarchical functionality includes a method for maintaining and evaluating parent-child relationships.

4. The method of claim 1, wherein the hierarchy base class further includes attributes for storing parent-child relationships.

5. The method of claim 1, wherein the step of linking the first application object to the first hierarchy object comprises linking by using the first reference.

6. The method of claim 5, wherein the step of linking the first application object to the first hierarchy object comprises at least one attribute for storing the first reference.

7. The method of claim 1, wherein an object of any hierarchy subclass stores references to objects of the same or another hierarchy subclass in one or more of attributes inherited by the at least one hierarchy subclass from the hierarchy base class.

8. The method of claim 1, wherein the at least one application class of the first application object is the same or different as the at least application class of the second application object.

9. The method of claim 1, wherein the at least one hierarchy subclass supplements the at least one hierarchical functionality by additionally providing a method for determining at least one of direct parents and direct children of the first or second application objects.

10. The method of claim 1, wherein the at least one hierarchy subclass supplements the at least one hierarchical functionality by additionally providing attributes specific for a particular application class.

11. The method of claim 1, wherein an application class hides functionalities of its hierarchy subclass, which includes the at least one hierarchical functionality.

12. The method of claim 11, wherein the at least one application class provides application functionalities for accessing parent-child relationships among application objects, which are implemented with hidden interfaces.

13. The method of claim 1, wherein the at least one application class is a location class whose objects include information about one location respectively.

14. The method of claim 1, wherein the at least one application class is a zone class whose objects include information about a zone respectively, wherein each zone is hierarchically related to zero, one or more locations.

15. The method of claim 1, wherein the method is programmed in a programming language that does not support both multiple inheritance and partial interface implementation.

16. A computer-readable recording medium storing a computer program having instructions which, when executed on a computer, cause the computer to perform a method for representing and accessing related application data that is arranged in hierarchical relationships, the method comprising:

providing classes including:
- a hierarchy base class providing at least one hierarchical functionality related to the hierarchical relationships;
- at least one hierarchy subclass that is derived from the hierarchy base class; and
- at least one application class for the application data, wherein the at least one application class defines at least one of attributes and methods in a transportation optimization context;

instantiating objects including:
- a first application object of the at least one application class;
- a second application object of the at least one application class, wherein the second application object is different from the first application object;
- a first hierarchy object of the at least one hierarchy subclass; and
- a second hierarchy object of the at least one hierarchy subclass, wherein the second hierarchy object is different from the first hierarchy object;

linking, by using a processor of the computer, the first application object to the first hierarchy object, and the second application object to the second hierarchy object;

providing a first reference to the first hierarchy object for use by the at least one hierarchical functionality, the first reference referencing the second hierarchy object;

providing a second reference to the second hierarchy object for use by the at least one hierarchical functionality, the second reference referencing the first hierarchy object; and relating the first application object and the second application object by using the first hierarchy object and the second hierarchy object, wherein the first application object accesses application data stored in the second application object by implementing the at least one hierarchical functionality using the first reference to link the first hierarchy object to the second hierarchy object to access the second application object via the second hierarchy object, and wherein the second application object accesses application data stored in the first application object by implementing the at least one hierarchical functionality using the second reference to link the second hierarchy object to the first hierarchy object to access the first application object via the first hierarchy object.

17. A computer system for representing and accessing related application data that is arranged in hierarchical relationships without resorting to multiple inheritance functionalities, comprising:

a storage device for storing classes including:
   a hierarchy base class providing at least one hierarchical functionality related to the hierarchical relationships;
   at least one hierarchy subclass that is derived from the hierarchy base class; and
   at least one application class for the application data, wherein the at least one application class defines at least one of attributes and methods in a transportation optimization context; and a processor for instantiating objects including:
   a first application object of the at least one application class;
   a second application object of the at least one application class, wherein the second application object is different from the first application object;
   a first hierarchy object of the at least one hierarchy subclass; and
   a second hierarchy object of the at least one hierarchy subclass, wherein the second hierarchy object is different from the first hierarchy object, and wherein the processor:

links the first application object to the first hierarchy object, and the second application object to the second hierarchy object;

provides a first reference to the first hierarchy object for use by the at least one hierarchical functionality, the first reference referencing the second hierarchy object;

provides a second reference to the second hierarchy object for use by the at least one hierarchical functionality, the second reference referencing the first hierarchy object; and relates the first application object and the second application object by using the first hierarchy object and the second hierarchy object, wherein the first application object accesses application data stored in the second application object by implementing the at least one hierarchical functionality using the first reference to link the first hierarchy object to the second hierarchy object to access the second application object via the second hierarchy object, and wherein the second application object accesses application data stored in the first application object by implementing the at least one hierarchical functionality using the second reference to link the second hierarchy object to the first hierarchy object to access the first application object via the first hierarchy object.

* * * * *

UNITED STATES PATENT AND TRADEMARK OFFICE
CERTIFICATE OF CORRECTION

| | |
|---|---|
| PATENT NO. | : 7,627,856 B2 |
| APPLICATION NO. | : 11/025052 |
| DATED | : December 1, 2009 |
| INVENTOR(S) | : Winfried Schwarzmann |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1372 days.

Signed and Sealed this

Twenty-first Day of December, 2010

David J. Kappos
*Director of the United States Patent and Trademark Office*